(12) United States Patent
Gam

(10) Patent No.: US 9,133,350 B2
(45) Date of Patent: Sep. 15, 2015

(54) ANTICRATER AGENT FOR ELECTROCOAT COMPOSITION

(75) Inventor: Allisa Gam, Troy, MI (US)

(73) Assignee: AXALTA COATING SYSTEMS IP CO., LLC, Wilmington, DE (US)

(*) Notice: Subject to any disclaimer, the term of this patent is extended or adjusted under 35 U.S.C. 154(b) by 190 days.

(21) Appl. No.: 13/348,525

(22) Filed: Jan. 11, 2012

(65) Prior Publication Data

US 2012/0175261 A1    Jul. 12, 2012

Related U.S. Application Data

(60) Provisional application No. 61/431,569, filed on Jan. 11, 2011.

(51) Int. Cl.
*C25D 11/00* (2006.01)
*B41M 5/20* (2006.01)
*C09D 5/44* (2006.01)

(52) U.S. Cl.
CPC .................. *C09D 5/4492* (2013.01)

(58) Field of Classification Search
CPC ........................................... C25D 3/02
USPC ......................................... 528/87
See application file for complete search history.

(56) References Cited

U.S. PATENT DOCUMENTS

| | | | |
|---|---|---|---|
| 3,922,253 A | 11/1975 | Jerabek | |
| 4,137,140 A | 1/1979 | Belanger | |
| 4,419,467 A | 12/1983 | Wismer | |
| 4,468,307 A | 8/1984 | Wismer | |
| 5,185,065 A | 2/1993 | Gam | |
| 5,356,960 A | 10/1994 | Gam | |
| 5,723,519 A | 3/1998 | Gam | |
| 5,750,596 A | 5/1998 | Gam | |
| 5,883,276 A | 3/1999 | Gam | |
| 5,908,910 A | 6/1999 | Gam | |
| 6,207,731 B1 | 3/2001 | Gam | |
| 6,846,400 B2 * | 1/2005 | Klein et al. | 204/499 |
| 6,908,539 B2 | 6/2005 | Gam | |
| 6,919,004 B2 | 7/2005 | Gam | |
| 7,264,705 B2 | 9/2007 | Gam | |
| 7,264,706 B2 | 9/2007 | Gam | |
| 2006/0084726 A1 * | 4/2006 | Gam et al. | 523/415 |

* cited by examiner

*Primary Examiner* — Peter F Godenschwager
*Assistant Examiner* — David Karst
(74) *Attorney, Agent, or Firm* — Ingrassia Fisher & Lorenz, P.C.

(57) ABSTRACT

The present disclosure relates to an improved electrocoating coating composition wherein the improvement is the addition of a non-water reducible anticrater agent. The non-water reducible anticrater agent is a polyester that is the reaction product of an aliphatic carboxylic acid anhydride, a monofunctional epoxy compound, a monofunctional alcohol and a polyepoxide. The improved electrocoating composition provides cured coatings that have fewer craters and have a smooth surface when compared to coatings utilizing other anticrater additives.

15 Claims, No Drawings

ANTICRATER AGENT FOR ELECTROCOAT COMPOSITION

CROSS-REFERENCE TO RELATED APPLICATION

This application claims priority under 35 U.S.C. §119 from U.S. Provisional Application Ser. No. 61/431,569, filed Jan. 11, 2011 which is hereby incorporated by reference in its entirety.

FIELD OF THE DISCLOSURE

The present disclosure is directed to an improved cathodic electrocoating composition and in particular to an improved cathodic electrocoating composition wherein the improvement is the incorporation of a non-water reducible anticrater agent, which significantly reduces craters and improves the smoothness of an electrocoated film of the composition.

BACKGROUND OF DISCLOSURE

The coating of electrically conductive substrates by an electrocoating process is a well-known and important industrial process. The electrocoating of primers to substrates is widely used in the automotive industry. In this process, a conductive article, such as an automobile body or an automobile part, is immersed in a bath comprising an aqueous emulsion of film forming polymer and acts as an electrode in the electrocoating process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Film forming polymer compositions used in the bath of a typical cathodic electrocoating process are well known in the art. These polymers are typically made from polyepoxides which have been chain extended using bisphenol compounds. The chain extended polyepoxides can then be reacted with amines to form an epoxy amine adduct. These polymers are blended with a crosslinking agent and then neutralized with an acid to form a water emulsion, which is usually referred to as a principal emulsion.

The principal emulsion can be combined with a pigment paste, coalescent solvents, water, and other additives to form the electrocoating composition. The composition is placed in an insulated tank containing the anode. The article to be coated is the cathode and is placed in a tank containing the electrocoating composition. An electrical current is applied to the system and a layer of the electrocoating composition is deposited onto the article. The thickness of the applied layer of electrocoating composition that is deposited on the article is a function of, for example, the bath characteristics, the electrical operating characteristics and the immersion time.

The resulting coated article is removed from the bath after a period of time and is rinsed with deionized water. The coating on the article can then be cured, typically in an oven, at sufficient temperature to produce a crosslinked finish on the article.

Cathodic electrocoating compositions, resin compositions, coating baths and cathodic processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

A continuing problem with cathodic electrocoating compositions has been the presence of craters in the cured finish. A number of anticrater agents have been used in the past to eliminate craters. However, the presence of conventional anticrater agents in electrocoating compositions has had a negative impact on the adhesion of subsequent coating layers applied thereto, such as automotive PVC sealers used for sealing joints and primer surfacers, particularly where the electrocoating film has been cured in an oven without the presence $NO_x$ (nitrogen oxides), such as in an indirect gas or electric oven. There is a continuing need for electrocoating compositions that can produce crater-free, smooth and even finishes that do not adversely affecting the adhesion of coatings that are subsequently applied to the electrocoated substrate.

STATEMENT OF THE DISCLOSURE

The present disclosure is directed to an improved cathodic electrocoating composition, comprising an aqueous emulsion having dispersed therein a crosslinkable component and a crosslinking agent; wherein the improvement is the incorporation of a non-water reducible anticrater agent comprising a polyester which is the reaction product of a monomer mixture consisting essentially of:
(a) a cyclic aliphatic carboxylic acid anhydride;
(b) a monofunctional epoxy compound;
(c) a monofunctional alcohol; and
(d) a polyepoxy compound;
wherein the cyclic aliphatic carboxylic acid anhydride contains one or more side chains selected from the group consisting of an alkyl side chain having in the range of from 6 to 20 carbon atoms, an alkenyl side chain having in the range of from 6 to 20 carbon atoms and a combination thereof.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

The phrase "non-water reducible anticrater agent" means that the anticrater agent is free from ionic bonds that result from the neutralization of carboxylic acid groups using an amine or other base. In some embodiments, the non-water reducible anticrater agent has a solubility in water of less than 0.5 grams/liter. In further embodiments, the non-water reducible anticrater agent has a solubility in water of less than 0.1 grams/liter.

It has been found that the addition of the disclosed non-water reducible anticrater agent can improve the smoothness and reduce the amount of craters of a cured layer of electrocoat composition when compared to the same amount of a water reducible anticrater agents typically used in electrocoat compositions. In some embodiments, the non-water reducible anticrater agent is a polyester which is the reaction product of a monomer mixture consisting of or consisting essentially of:

(a) an aliphatic carboxylic acid anhydride;
(b) a monofunctional epoxy compound;
(c) a monofunctional alcohol; and
(d) a polyepoxy compound.

In some embodiments, the anticrater agent can be formed by 1) contacting an aliphatic carboxylic acid anhydride, a monofunctional epoxy and a monofunctional alcohol at a temperature in the range of from 50° C. to 250° C. to form an intermediate polyester followed by the formation of the polyester by 2) contacting the intermediate polyester with a polyepoxy compound at a temperature in the range of from 0° C. to 150° C.

An aliphatic carboxylic acid anhydride can be used to form the anticrater agent. In some embodiments, the aliphatic carboxylic acid anhydride can be a cyclic aliphatic carboxylic acid anhydride that is substituted by one or more alkyl side chains having in the range of from 6 to 20 carbon atoms, by one or more alkenyl side chains having in the range of from 6 to 20 carbon atoms, or by a combination thereof, wherein the side chain can be linear, branched, cyclic or a combination thereof. In some embodiments, the aliphatic carboxylic acid anhydride contains at least one of the alkyl side chains having in the range of from 8 to 18 carbon atoms. In some embodiments, the side chain can also comprise at least one carbon-carbon double bond. In other embodiments, the aliphatic carboxylic acid anhydride can include compounds such as those having a structure according to (I);

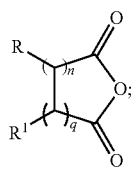

(I)

wherein each R is independently selected from the group consisting of a linear alkyl or alkenyl group having in the range of from 6 to 20 carbon atoms or a branched alkyl or alkenyl group having in the range of from 6 to 20 carbon atoms; each $R^1$ is independently selected from the group consisting of hydrogen, a linear alkyl or alkenyl group having in the range of from 6 to 20 carbon atoms, or a branched alkyl or alkenyl group having in the range of from 6 to 20 carbon atoms; or wherein R and $R^1$ may be taken together to form a ring having in the range of from 5 to 6 carbon atoms wherein the ring may optionally be substituted with a linear or branched alkyl group having in the range of from 1 to 18 carbon atoms or a linear or branched alkenyl group having in the range of from 2 to 18 carbon atoms; n is in the range of from 1 to 2; and q is in the range of from 1 to 2. Combinations of any of the aliphatic carboxylic acid anhydrides can also be used. Suitable aliphatic carboxylic acid anhydrides can include, for example, methylhexahydrophthalic anhydride, dodecylsuccinic anhydride, octylsuccinic anhydride, hexadecenylsuccinic anhydride, octenylsuccinic anhydride, octadecenylsuccinic anhydride, tetradecenylsuccinic anhydride, dodecenylsuccinic anhydride or a combination thereof. In other embodiments, the aliphatic carboxylic acid anhydrides include for example, dodecenylsuccinic anhydride, octadecenylsuccinic anhydride or a combination thereof.

The anticrater agent can be formed from a monomer mixture that includes a monofunctional epoxy compound. In some embodiments, the monofunctional epoxy can be a monofunctional epoxy ester, for example, the glycidyl ester of a carboxylic acid or an epoxy ether. In still further embodiments, the monofunctional epoxy ester can be the glycidyl ester of a carboxylic acid wherein the carboxylic acid has a structure according to (II);

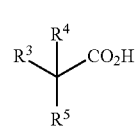

(II)

wherein each $R^3$, $R^4$ and $R^5$ is independently selected from the group consisting of a linear alkyl groups having in the range of from 1 to 12 carbon atoms, a branched alkyl group having in the range of from 3 to 12 carbon atoms, a cycloaliphatic alkyl group having in the range of from 5 to 8 carbon atoms or a combination thereof. In some embodiments, the total number of carbon atoms in the combination of $R^3$, $R^4$ and $R^5$ can be in the range of from 4 to 20. In other embodiments, the total number of carbon atoms in the combination of $R^3$, $R^4$ and $R^5$ can be in the range of from 7 to 12. Suitable examples of the monofunctional epoxy ester can include, for example, the glycidyl esters of pivalic acid, 2,2-dimethyl butyric acid, neodecanoic acid, VERSATIC® acid or a combination thereof.

Other monofunctional epoxy compounds which can be used include, for example, glycidyl ethers of monohydric alcohols wherein the alcohols contain in the range of from 4 to 20 carbon atoms or glycidyl ethers of aromatic monohydric alcohols. Representative examples of glycidyl ethers can include, for example, o-cresyl glycidyl ether, phenyl glycidyl ether, butyl glycidyl ether, octyl glycidyl ether, dodecyl glycidyl ether, glycidoxypropyltrimethoxysilane, glycidoxypropyltriethoxysilane, 2-ethylhexyl glycidyl ether or a combination thereof.

The anticrater agent can be formed from a monomer mixture that includes a monofunctional alcohol. In some embodiments, the monofunctional alcohols can include alcohols containing linear, branched, cycloaliphatic alkyl groups or a combination thereof. In further embodiments, the monofunctional alcohols can contain in the range of from 4 to 12 carbon atoms and can be a linear, branched or cycloaliphatic alcohol. In still further embodiments, the monofunctional alcohols can include, for example, hexanol, 2-methyl butanol, 2-ethylhexanol, cyclohexyl methanol, methyl cyclohexanol, cyclohexanol, octanol or a combination thereof.

In some embodiments, the anticrater agent can be produced by first forming an intermediate polyester. The intermediate polyester can be produced by contacting a monomer mixture consisting of an aliphatic acid anhydride, a monofunctional epoxy compound, a monofunctional alcohol and optionally, a catalyst at a temperature in the range of from 50° C. to 250° C. for a time period ranging from 10 minutes to 24 hours. A solvent can be used or the formation of the intermediate polyester can be performed without the use of a solvent. In some embodiments, the ratio of monomers in the monomer mixture can be chosen so that the intermediate polyester contains carboxylic acid groups. In some embodiments, the acid number of the intermediate polyester can be in the range of from 10 mg KOH/g to 300 mg KOH/g. In other embodiments, the acid number of the intermediate polyester can be in the range of from 35 mg KOH/g to 275 mg KOH/g, and in still further embodiments, the acid number of the intermediate polyester can be in the range of from 50 mg KOH/g to 250 mg KOH/g. In some embodiments, the monomer mixture can be heated until the weight per epoxy group of the intermediate polyester is as high as possible, for example greater than 15,000 Daltons. In other embodiments, the monomer mixture is heated until the weight per epoxy group of the intermediate polyester is greater than 17,000 Daltons, and in still further embodiments, until the weight per epoxy group of the intermediate polyester is greater than 18,000 Daltons. The optional catalyst can include, for example, triarylphosphines, triphenylphosphine, alkyltriarylphosphonium halides, ethyltriphenylphosphonium halide, alkyltriarylphosphonium esters, ethyltriphenylphosphonium acetate, ethyltriphenylphosphonium diacetate, tetraalkylphosphonium halide or a combination thereof.

In some embodiments, the intermediate polyester can be reacted with a polyepoxy compound to form the desired polyester anticrater agent. Suitable polyepoxy compounds can have an epoxy group equivalency of, on average, two or more. In some embodiments, the polyepoxy compounds can be saturated, unsaturated, cyclic, alicyclic, aliphatic, cycloaliphatic, aromatic or heterocyclic. In further embodiments, the polyepoxy compounds can also contain substituents such as, for example, halogens, hydroxyl groups, ethers, alkyl and/or aryl groups provided that the substituents do not adversely affect the reactivity of the epoxy group or the properties of the resulting polyester.

Suitable polyepoxy compounds can include, for example, the glycidyl ethers of polyols, especially, cyclic polyols and/or aromatic polyols. In some examples, these can include, the polyglycidyl ethers of 1,1-bis-(4-hydroxyphenyl) ethane, 1,1-bis-(4-hydroxyphenyl) propane, 2,2-bis-(4-hydroxyphenyl) propane, 2,2-bis(4-hydroxy-3-tertiarybutylphenyl)propane, bis-(4-hydroxyphenyl) methane, bis-(2-hydroxyphenyl) methane, 1,4-dihydroxy naphthalene, 1,5-dihydroxy naphthalene, 1,2-bis(hydroxymethyl)cyclohexane, 1,3-bis-(hydroxymethyl)cyclohexane, 1,4-bis(hydroxymethyl)cyclohexane, 1,2-cyclohexane diol, 1,4-cyclohexane diol, hydrogenated bisphenol A, trimethylol propane, pentaerythritol and a combination thereof.

In some embodiments, the polyepoxy compounds can have a molecular weight in the range of from 100 to 3,000 Daltons and in further embodiments, can have a molecular weight in the range of from 340 to 2,000 Daltons.

The intermediate polyester can be contacted with polyepoxide compound at a temperature in the range of from 20° C. to 150° C., optionally in the presence of a catalyst and/or organic solvent for 10 minutes to 24 hours to give the desired polyester anticrater agent. In some embodiments, the completion of the reaction can be measured by the disappearance of the epoxide peak as measured by infrared radiation. In some embodiments, a catalyst can be used during the formation of the polyester. Suitable catalysts can include for example, triarylphosphines, triphenylphosphine, alkyltriarylphosphonium halides, ethyltriphenylphosphonium halide, alkyltriarylphosphonium esters, ethyltriphenylphosphonium acetate, ethyltriphenylphosphonium diacetate, tetraalkylphosphonium halide or a combination thereof. The viscosity of the polyester can be adjusted by adding or removing organic solvent as needed.

The anticrater additive can be used with cathodic electrocoating compositions that are typically used in the automotive industry. Such electrocoating compositions comprise an aqueous emulsion having film forming binders dispersed therein. The film forming binders can comprise any of the known electrocoating crosslinkable components and crosslinking agents. In some embodiments, the crosslinkable component comprises or consists essentially of an epoxy amine adduct and the crosslinking agent comprises or consists essentially of blocked polyisocyanates.

To disperse the non-water reducible anticrater agent in the electrocoating composition, the anticrater agent can be combined with the crosslinkable component and the crosslinking agent and mixed. In some embodiments, the anticrater agent can be used in an amount in the range of from 0.5 to 10 percent by weight, based on the weight of the crosslinkable component and the crosslinking agent. In other embodiments, the anticrater agent can be used in an amount in the range of from 1 to 5 percent by weight, based on the weight of the crosslinkable component and the crosslinking agent. In some embodiments, the anticrater agent can be used in an amount in the range of from 0.5 to 10 percent by weight, based on the weight of the epoxy amine adduct and the blocked polyisocyanate crosslinking agent. In still further embodiments, the anticrater agent can be used in an amount in the range of from 1 to 5 percent by weight, based on the weight of the epoxy amine adduct and the blocked polyisocyanate crosslinking agent.

After mixing the anticrater agent with the epoxy amine adduct and the crosslinking agent, an aqueous acid can be added. The aqueous acid forms an ammonium salt with the epoxy amine adduct, producing a water soluble or water dispersible mixture which is known as the principal emulsion. While not wishing to be bound by theory, it is thought that the acid of the aqueous acid used to form the principal emulsion is a stronger acid than any remaining acid groups of the polyester anticrater agent. If any acid functional groups remain on the polyester anticrater agent, and those acid groups form a salt with the epoxy amine adduct, it is believed that the acid groups of the aqueous acid would then displace them regenerating the original polyester anticrater agent with free acid groups.

The principal emulsion can then be combined with known pigment pastes, coalescing solvents and other additives that are common in the art to form the electrocoating composition. The electrocoating composition is placed in an insulated tank containing the anode. The object to be coated is made the cathode and is passed through the tank containing the electrocoating composition. The thickness of the coating is a function of the bath characteristics, the electrical operating characteristics, the immersion time, and so forth. After coating, the object is removed from the bath and can be rinsed with deionized water. The applied coating can then be cured in an oven at sufficient temperature to produce crosslinking. Usually the cured electrocoat composition is overcoated with any of a variety of different topcoat systems (e.g. basecoat/clearcoat) as is known in the art.

Another embodiment of the present disclosure is a substrate that is coated with a dried and cured layer of the improved electrocoating composition. In these embodiments, a substrate is coated with a layer of the electrocoating composition comprising the anticrater additive and the applied layer is dried and cured to produce a crosslinked coating on a substrate. The step of curing can take place in a curing oven at a temperature in the range of from 150° C. to 190° C. for 10 to 60 minutes. The cured coating layer can have a dry film thickness in the range of from 10 micrometers to 30 micrometers.

Suitable substrates can include any electrically conductive material, especially those for an automobile vehicle or body. Non-conductive substrates that have been made electrically conductive by the addition of a conductive coating can also be coated.

Examples

A highly branched non water-reducible polyester was prepared by charging 266 parts dodecenylsuccinic anhydride, 130 parts 2-ethylhexanol, 244 parts glycidyl ester of neodecanoic acid and 2 parts triphenylphosphine into a suitable reaction vessel and heated to 116° C. under a nitrogen blanket. The reaction was held at 132° C. until essentially all of epoxy group was reacted as indicated by titration method. 266 parts dodecenylsuccinic anhydride and 2 parts triphenylphosphine were added and held at 132° C. until an acid number of 55 mg KOH per g of sample or greater was achieved. 181 parts EPON® 828 (epoxy resin with 188 EEW) and 2 parts triphenylphosphine were charged into the reaction vessel. The reaction mixture was held at 132° C. until all of the epoxy resin was reacted as indicated by titration method. 263 parts methyl isobutyl ketone was added. The resulting resin solution had a nonvolatile of 80% in methyl isobutyl ketone.

What is claimed is:

1. An improved cathodic electrocoating composition, comprising an aqueous emulsion having dispersed therein a crosslinkable component and a crosslinking agent and further comprising a non-water reducible anticrater agent comprising a polyester which is the reaction product of (d) a polyepoxy compound and an intermediate polyester which is the reaction product of a monomer mixture consisting of (a) a cyclic aliphatic carboxylic acid anhydride, (b) a monofunctional epoxy compound, and (c) a monofunctional alcohol wherein the cyclic aliphatic carboxylic acid anhydride comprises one or more side chains selected from the group consisting of an alkyl side chain having in the range of from 6 to 20 carbon atoms, an alkenyl side chain having in the range of from 6 to 20 carbon atoms and a combination thereof, wherein the non-water reducible anticrater agent has a solubility in water of less than 0.5 grams/liter, and wherein the intermediate polyester has a molecular weight per epoxy group of greater than 15,000 Daltons.

2. The composition of claim 1, wherein the aliphatic carboxylic acid anhydride has a structure according to formula (I);

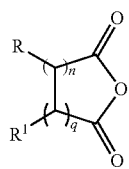

wherein each R is independently selected from the group consisting of a linear alkyl or alkenyl group having in the range of from 6 to 20 carbon atoms or a branched alkyl or alkenyl group having in the range of from 6 to 20 carbon atoms; each R¹ is independently selected from the group consisting of hydrogen, a linear alkyl or alkenyl group having in the range of from 6 to 20 carbon atoms, or a branched alkyl or alkenyl group having in the range of from 6 to 20 carbon atoms; or wherein R and R¹ may be taken together to form a ring having in the range of from 5 to 6 carbon atoms wherein the ring may optionally be substituted with a linear or branched alkyl group having in the range of from 1 to 18 carbon atoms or a linear or branched alkenyl group having in the range of from 2 to 18 carbon atoms; n is in the range of from 1 to 2; and q is in the range of from 1 to 2.

3. The composition of claim 1 wherein the monofunctional alcohol contains in the range of from 4 to 12 carbon atoms and is a linear, branched or cycloaliphatic alcohol.

4. The composition of claim 3 wherein the monofunctional alcohol is chosen from the group consisting of hexanol, 2-methyl butanol, 2-ethylhexanol, cyclohexyl methanol, methyl cyclohexanol, cyclohexanol, octanol and a combination thereof.

5. The composition of claim 1 wherein the monofunctional epoxy is an epoxy ester or an epoxy ether.

6. The composition of claim 5 wherein the monofunctional epoxy is the glycidyl ester of a carboxylic acid wherein the carboxylic acid has a structure according to formula (II);

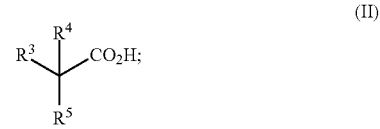

wherein each R³, R⁴ and R⁵ is independently selected from the group consisting of a linear alkyl group having in the range of from 1 to 12 carbon atoms, a branched alkyl group having in the range of from 3 to 12 carbon atoms, a cycloaliphatic alkyl group having in the range of from 5 to 8 carbon atoms or a combination thereof.

7. The composition of claim 1 wherein the polyepoxy compound is chosen from the group consisting of polyglycidyl ethers of 1,1-bis-(4-hydroxyphenyl)ethane, 1,1-bis-(4-hydroxyphenyl)propane, 2,2-bis-(4-hydroxyphenyl)propane, 2,2-bis(4-hydroxy-3-tertiarybutylphenyl)propane, bis-(4-hydroxyphenyl)methane, bis-(2-hydroxyphenyl)methane, 1,4-dihydroxy naphthalene, 1,5-dihydroxy naphthalene, 1,2-bis(hydroxymethyl)cyclohexane, 1,3-bis-(hydroxymethyl)cyclohexane, 1,4-bis(hydroxymethyl)cyclohexane, 1,2-cyclohexane diol, 1,4-cyclohexane diol, hydrogenated bisphenol A, trimethylol propane, pentaerythritol or a combination thereof.

8. The composition of claim 1 wherein the cathodic electrocoat composition contains in the range of from 0.5 to 10 percent by weight of the anticrater agent, wherein the weight percentage is based on the amount of the crosslinkable component and the crosslinking agent.

9. The composition of claim 8 wherein the crosslinkable component is an epoxy amine adduct and the crosslinking agent is a blocked polyisocyanate.

10. The composition of claim 1, wherein the non-water reducible anticrater agent has a solubility in water of less than 0.1 grams/liter.

11. The composition of claim 1, wherein the molecular weight per epoxy group is greater than 17,000 Daltons.

12. The composition of claim 1, wherein the molecular weight per epoxy group is greater than 18,000 Daltons.

13. A coated substrate, the coated substrate being coated with layer of an improved cathodic electrocoating composition comprising an aqueous emulsion having dispersed therein a crosslinkable component and a crosslinking agent, and further comprising a non-water reducible anticrater agent comprising a polyester which is the reaction product of (d) a polyepoxy compound and an intermediate polyester which is the reaction product of a monomer mixture consisting of (a) a cyclic aliphatic carboxylic acid anhydride, (b) a monofunctional epoxy compound, and (c) a monofunctional alcohol wherein the cyclic aliphatic carboxylic acid anhydride comprises one or more side chains selected from the group consisting of an alkyl side chain having in the range of from 6 to 20 carbon atoms, an alkenyl side chain having in the range of from 6 to 20 carbon atoms and a combination thereof, wherein the non-water reducible anticrater agent has a solubility in water of less than 0.5 grams/liter, and wherein the intermediate polyester has a molecular weight per epoxy group of greater than 15,000 Daltons.

14. An improved cathodic electrocoating composition, comprising an aqueous emulsion having dispersed therein a crosslinkable component and a crosslinking agent, and further comprising a non-water reducible anticrater agent comprising a polyester which is the reaction product of (d) a polyepoxy compound and an intermediate polyester which is the reaction product of a monomer mixture consisting of (a) a cyclic aliphatic carboxylic acid anhydride, (b) a monofunctional epoxy compound, and (c) a monofunctional alcohol wherein the cyclic aliphatic carboxylic acid anhydride comprises one or more side chains selected from the group consisting of an alkyl side chain having in the range of from 6 to 20 carbon atoms, an alkenyl side chain having in the range of from 6 to 20 carbon atoms and a combination thereof, and wherein the intermediate polyester comprises epoxy groups.

15. The composition of claim 12, wherein the non-water reducible anticrater agent has a solubility in water of less than 0.5 grams/liter.

* * * * *